United States Patent [19]

Clement

[11] Patent Number: 5,684,963

[45] Date of Patent: Nov. 4, 1997

[54] SYSTEM AND METHOD FOR DISTRIBUTING VIDEO FROM A PLURALITY OF VIDEO PROVIDERS

[75] Inventor: David J. Clement, Montreal, Canada

[73] Assignee: Discreet Logic, Inc., Canada

[21] Appl. No.: 407,908

[22] Filed: Mar. 20, 1995

[51] Int. Cl.[6] .................................................. G06F 3/00
[52] U.S. Cl. .......................... 395/226; 395/228; 395/237; 395/327
[58] Field of Search .................................. 395/161, 226, 395/228, 237, 327; 364/401, 918.4

[56] References Cited

U.S. PATENT DOCUMENTS

| 4,538,188 | 8/1985 | Barker et al. | 360/14 |
|---|---|---|---|
| 4,685,003 | 8/1987 | Westland | 360/14 |
| 4,937,685 | 6/1990 | Barker et al. | 360/14 |
| 4,939,594 | 7/1990 | Moxon et al. | 360/14 |
| 4,943,866 | 7/1990 | Barker et al. | 358/335 |
| 4,979,050 | 12/1990 | Westland | 360/14 |

FOREIGN PATENT DOCUMENTS

WO 84/02606  7/1984  WIPO.

OTHER PUBLICATIONS

R.A. Gagliano et al., "Auction Allocation of Computing Resources", *Communications of the ACM*, 38, No. 6, 88–102 (Jun. 1995).

The Brughetti Corporation, Montreal, Canada product brochure, distributed at the National Association of Broadcasters (NAB) Convention, Las Vegas, Nevada, Mar. 19–24, 1994.

*Primary Examiner*—Raymond J. Bayerl
*Assistant Examiner*—A. Katbab
*Attorney, Agent, or Firm*—Schwegman, Lundberg, Woessner & Kluth, P.A.

[57] ABSTRACT

A system and method for controlling the transfer of commodities stored in a plurality of resource pools. The system comprises one or more customer stations connected via a network to a plurality of providers. A resource pool provider is associated with and controls each resource pool. Each resource pool provider includes provider controller software which maintains a record of commodities present in its associated resource pool. Requests for commodities such as video or audio segment, manufactured goods, raw material or data are transmitted to each of the resource pool providers and each resource pool provider determines if the commodities needed to fill that request are stored in its associated resource pool. If so, the provider generates a request reply acknowledging the resource request and offering to fill the request. The user looks at the request replies and chooses the provider to use based on factors such as the cost of the commodity, the quality of the commodity and the confidence the user has that the provider will actually be able to supply the commodity. Deliver of the commodity is then scheduled by both the chosen provider and the customer station. In addition, transport medium providers may be provided to compete for providing the transport medium used to transfer the commodity from the chosen resource pool to the customer station.

7 Claims, 19 Drawing Sheets

SYSTEM AND METHOD FOR DISTRIBUTING VIDEO FROM A PLURALITY OF VIDEO PROVIDERS

FIELD OF THE INVENTION

The present invention relates generally to resource control systems, and more particularly to a system and method for the distributed control of a plurality of resource pools to ensure efficient transmission of a commodity from a resource pool to a consumer.

BACKGROUND OF THE INVENTION

The advent of inexpensive mass data storage has fueled an explosive growth in the variety and quality of information sources. For instance, in the area of video production and broadcast, audio, video and text segments may be recorded in a variety of formats on video tape or may be written to digital storage devices such as disk arrays. Tracking and maintaining each of these information sources can be time-intensive and frustrating. To compound this problem, machines made by different manufacturers often cannot communicate with each other.

The video industry, therefore, has evolved into a fragmented environment where playback and recording equipment is distributed to areas throughout a facility. Video equipment cannot be shared throughout the facility (i.e. tape machines within the edit room can only be used in the edit room) and video material is often difficult to locate and must be duplicated before it can be shared. Furthermore, there is no standard interface to each of the pieces of video equipment and it is difficult to automate even those program steps that are repetitive and almost never change. In addition, programs cannot be edited unless all material is available and accessible to the editor.

Attempts to automate this system have been made with varying success. For instance, Sony has developed a library management system (or LMS) for providing access to a library of video tapes. The LMS is a robotic tape player that can handle multiple tape drives and up to a thousand video tapes. Each of the tape drives can be used as a separate video source; the LMS tracks where a particular segment is stored and can load and queue that segment for broadcast on one of the LMS video ports.

Although the LMS provides simplified access to a library of video tapes, it does not provide universal access to all the video storage equipment owned by a particular facility. Instead, it controls only that Sony tape equipment designed to operate with the LMS system. It therefore has become just another, albeit sophisticated, source of information.

Another method proposed for instilling order to this chaotic world is to centralize control of video equipment within a single processor. Such an approach has been used in a series of video editing machines. One such system is described in U.S. Pat. No. 4,538,188 issued Aug. 27, 1985 to Barker et al. The Barker system includes a controller/computer connected to a number of video tape machines and to an input and an output video switcher. The controller/computer controls the video switches and the video tape machines so that selected portions of the video inputs can be recorded on one of the video tape machines. Displays are provided for displaying labels associated with each of a sequence of video segments. An editing function is provided for manipulating the labels in order to change the sequence in which segments are displayed.

Likewise, Grass Valley Group has developed the Sabre system. The Sabre system includes a box which can be connected to RS422 ports of a number of video sources in order to control each of the video sources. Video or audio stored in one of the video sources can be accessed through the Sabre system and edited.

Both the Barker and the Sabre system are single seat closed systems. That is, each system must have total control over the video equipment within the system and the attached video equipment can be accessed only by a single user at any given time. Therefore, the system consumes all of the resources that are attached to it.

Video server systems have also been proposed for centralizing control of video equipment under a single processor. Under such a system, a server is connected to one or more video storage devices and to two or more users. The server responds to requests by each of the users and transfers video from the video storage devices to the user who requested that particular segment. Typically, the video storage devices are disk-based (reflecting a trend in the industry of moving from traditional tape systems to newer disk-based technology).

The video server approach does provide for sharing of video sources. It also has some major disadvantages. The systems are limited to digital information storage devices such as disk arrays and disk-based systems usually are expensive in terms of the storage volume they provide. Therefore, usually a tradeoff must be made between the video quality and the volume of video available. As a result, all of the servers which are currently available implement some form of video compression technique for achieving a predetermined video quality/storage volume ration (the lower the acceptable quality, the lower the storage volume required for a particular segment). The compression required to achieve an acceptable volume can result, however, in a video quality which may not be acceptable to many users. Furthermore, some compression techniques restrict playback and capture capabilities. In addition, such systems are vulnerable to single point failures and providing redundancy to decrease this vulnerability is very expensive. Finally, such approaches usually advocate replacing the existing video systems with all new disk-based technology. Many users have a substantial investment in the traditional video tape technology and cannot afford to throw away that investment.

The problem is that there is no universal strategy for dealing with the control of all the different sources of video. As a result, a great deal of manual transfer of tapes and of segments of tapes must be take place before a given program can be completed. But the problem with video equipment is not unique to that industry. What is needed is a system and method for controlling all sources, or resource pools, of a needed commodity in a manufacturer independent manner which permits access to the resource pools by multiple users acting independently. In particular, what is needed is a system and method for controlling video and disk-based machines in a manufacturer independent manner which permits concurrent access to the machines by multiple users distributed throughout the production facility. In addition, there is a need in the art for new methods of representing and accessing pieces of information stored in these video sources for simplified editing and production.

SUMMARY OF THE INVENTION

To overcome limitations in the art described above and to overcome other limitations that will become apparent upon reading and understanding the present specification, the present invention provides a system and method for controlling the transfer of commodities stored in a plurality of resource pools. The system comprises one or more customer stations connected via a network to a plurality of providers. A resource pool provider is associated with and controls each resource pool. Each resource pool provider includes provider controller software which maintains a record of commodities present in its associated resource pool. Requests for commodities such as video or audio segments, manufactured goods, raw material or data are transmitted to each of the resource pool providers and each resource pool provider determines if the commodities needed to fill that request are stored in its associated resource pool. If so, the provider generates a request reply acknowledging the resource request and offering to fill the request. The user looks at the request replies and chooses the provider to use based on factors such as the cost of the commodity, the quality of the commodity and the confidence the user has that the provider will actually be able to supply the commodity. Delivery of the commodity is then scheduled by both the chosen provider and the customer station. In addition, transport medium providers may be provided to compete for providing the transport medium used to transfer the commodity from the chosen resource pool to the customer station.

According to another aspect, the present invention provides video production apparatus comprising a network, a plurality of resource pools, a plurality of providers, a customer station connected to the network and a transport medium connected to the customer station and to the plurality of resource pools. The customer station includes message transfer means for generating a request for a video segment and receiving means for receiving the requested video segment. The transport medium includes means for transferring the video segment to the customer station. The resource pools include video storage means for storing a video segment. Each provider is connected to the network and to an associated resource pool and includes request receiving means for receiving requests generated by said customer station, resource pool management means for maintaining a record of what is present in its associated resource pool and request reply means for indicating to said customer station whether the provider can fill the request.

According to yet another aspect, the present invention provides a method of editing a broadcast sequence, comprising the steps of providing a customer station, providing a plurality of storage devices, providing a plurality of providers, wherein each provider is associated with a storage device and wherein each provider includes a provider controller which maintains a record of video segments present in its associated storage device, defining at said customer station an icon representing a video segment, wherein the step of defining includes defining a time at which the video segment is needed, checking the plurality of storage devices for the video segment, wherein the step of checking the plurality of storage devices includes the steps of executing provider program code within each of said plurality of providers to determine if the video segment is stored in its associated storage device and if the video segment is stored in its associated storage device, generating a request reply to said customer station offering to provide the video segment and scheduling delivery of said video segment. If the video segment is not present in one of said plurality of storage devices and it cannot be obtained by the time the video segment is needed, generating an error. Otherwise, selecting a provider from the providers which generated request replies and placing the icon in a sequence of icons representative of other video segments in order to establish a sequence of display for the video segments.

According to yet another aspect, the present invention provides a method of displaying video representative of a plurality of video sources, comprising the steps of sampling the plurality of video sources at predetermined intervals to obtain a video source sample representative of each of said plurality of video sources and displaying a matrix of video sources, wherein the step of displaying comprises the steps of selecting the video sources to be displayed and displaying the video source samples obtained from the selected video sources.

According to yet another aspect, the present invention provides a method of selecting types of video processing. According to the method, a video processing method to be performed on a video segment is selected and a process icon representative of the selected video processing method displayed to the user. At the same time a video icon representative of the video segment is displayed to the user. The user then drags the process icon so that it is adjacent to the video icon and associates the resulting combination with a second video icon. The second video icon can then be used as if the process has already been performed; the actual video processing occurs at some later time.

BRIEF DESCRIPTION OF THE DRAWINGS

The foregoing and other objects, features and advantages of the invention, as well as the presently preferred embodiments thereof, will become apparent upon reading and understanding the following detailed description and accompanying drawings in which.

DETAILED DESCRIPTION OF THE PREFERRED EMBODIMENT

Figure 1A:
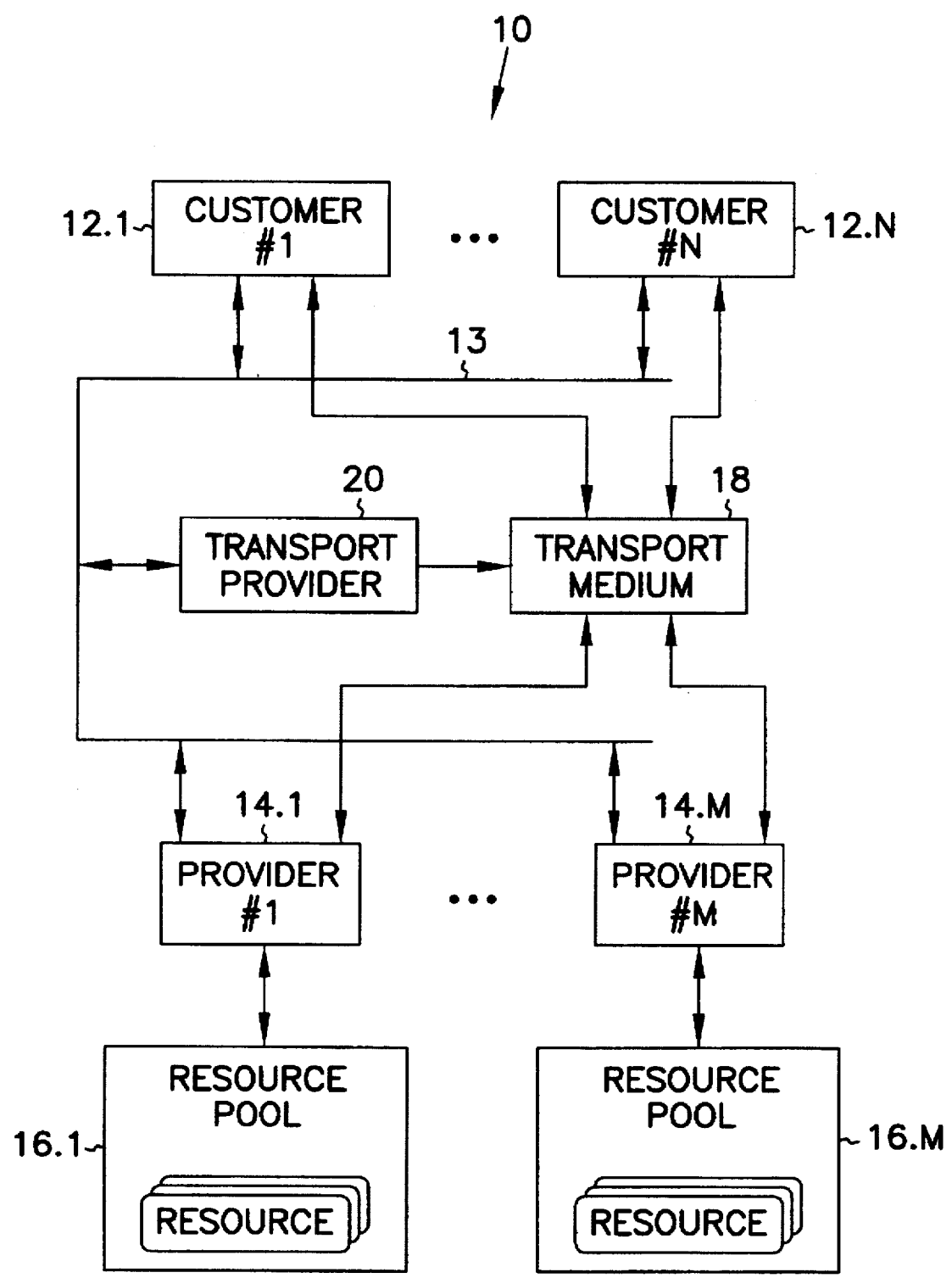
FIGS. 1A–1C are simplified block diagrams of systems for managing the transfer of commodities.

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

Economists and social scientists have recognized the importance of maintaining competitive environments in which suppliers vie to supply consumers with a given product by providing lower price, higher quality or more reliable delivery. Such competition tends to reduce the cost of the product, to improve its quality and to fuel innovation on the part of the suppliers. Where implemented, the free enterprise style of supply and demand has proved to be an efficient market stimulant. Such a free enterprise system can only operate efficiently, however, where the consumer or manufacturer has access to two or more suppliers who can compete to provide what is needed.

This free enterprise model of competition between suppliers has been adapted to solve the problem of transferring commodities from a plurality of resource pools to a consumer. In the following description the terms used are defined as follows:

Universal Object Identifier (UOI): An object identifier that uniquely identifies an object. The UOI incorporates the concepts of wealth and priority; it is broadcast with every request.

Customer: A customer requests (purchases) commodities. The customer also defines the deliver time required for a particular commodity. Possible delivery times include at a particular time, by a particular time, or as soon as possible.

Commodity: Anything desired by a customer. The concept of commodity can be used to define video and audio segments, blocks of data, production goods and raw materials.

Provider: A provider is responsible for the sale, control, ownership and delivery of a commodity. In order to contract with a customer to deliver a commodity, the provider must be able to have that commodity in its inventory by the desired time. A provider's ultimate objective is to maximize profit. Requests made by high priority clients are more profitable than requests made by lower priority clients. Therefore, a provider will always try to fill the requests of higher priority clients first.

Primary provider: A primary provider can originate a given commodity.

Secondary provider: A secondary provider is responsible for organizing, controlling and delivering a commodity that it buys from another provider. A secondary provider can add value to a transaction when it can execute an intermediate process on the commodity before passing it on the customer or to another secondary provider. For example, a secondary provider may be able to store a duplicate of a video or audio segment needed by two or more customers at approximately the same time (concept of time shifting). Or a secondary provider may be able to execute an image processing function such as decimation at a relatively low cost, may be able to deliver data at a higher transfer or may be able to reduce the cost of storage or transfer of a given commodity.

Inventory: Every provider maintains a list of commodities within its controls. The list of commodities includes commodities the provider intends to control in the future. Contracts for delivery can be executed for such future commodities in the same manner as can contracts for commodities the provider can provide at the present time.

Figure 1B:
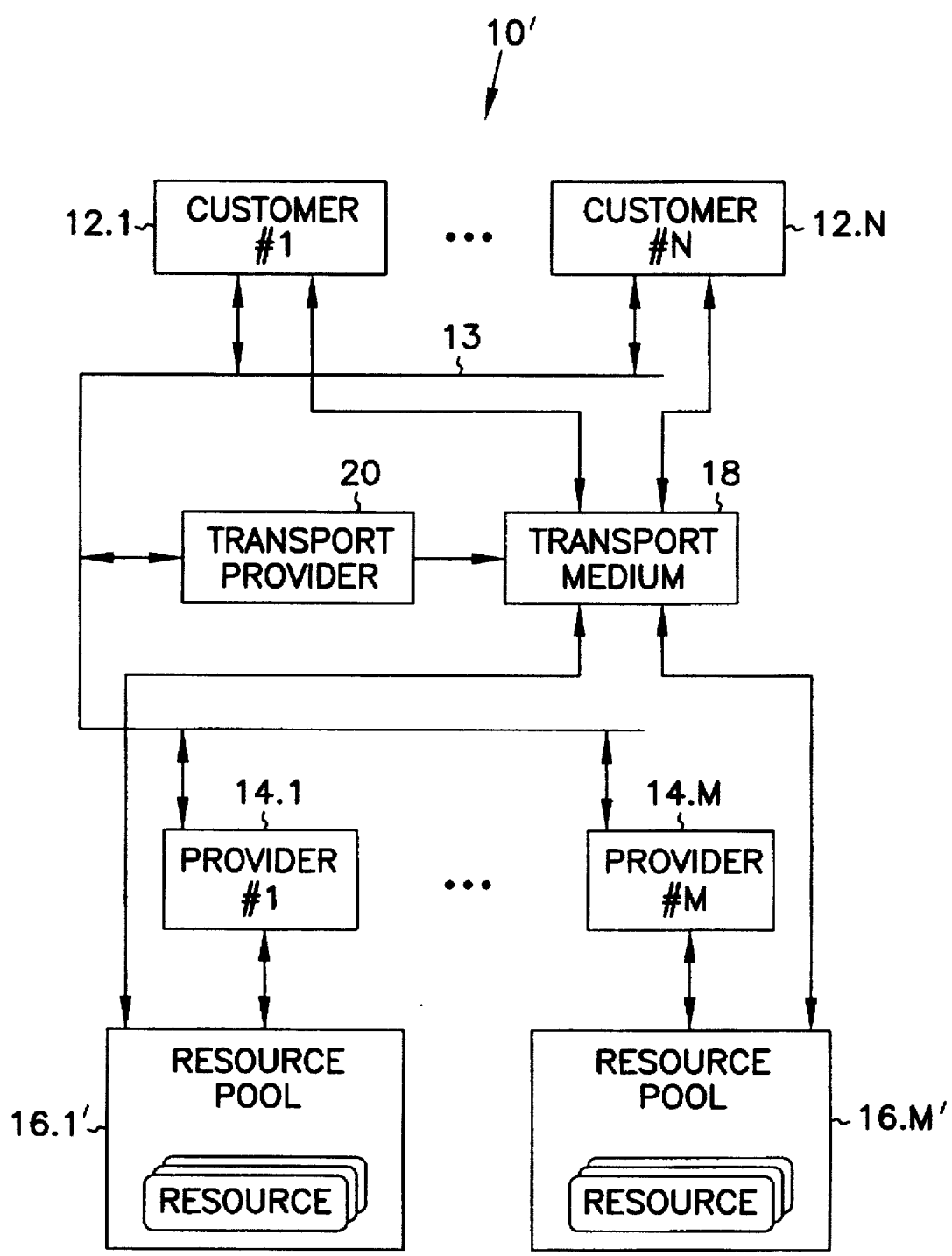
Figure 1C:
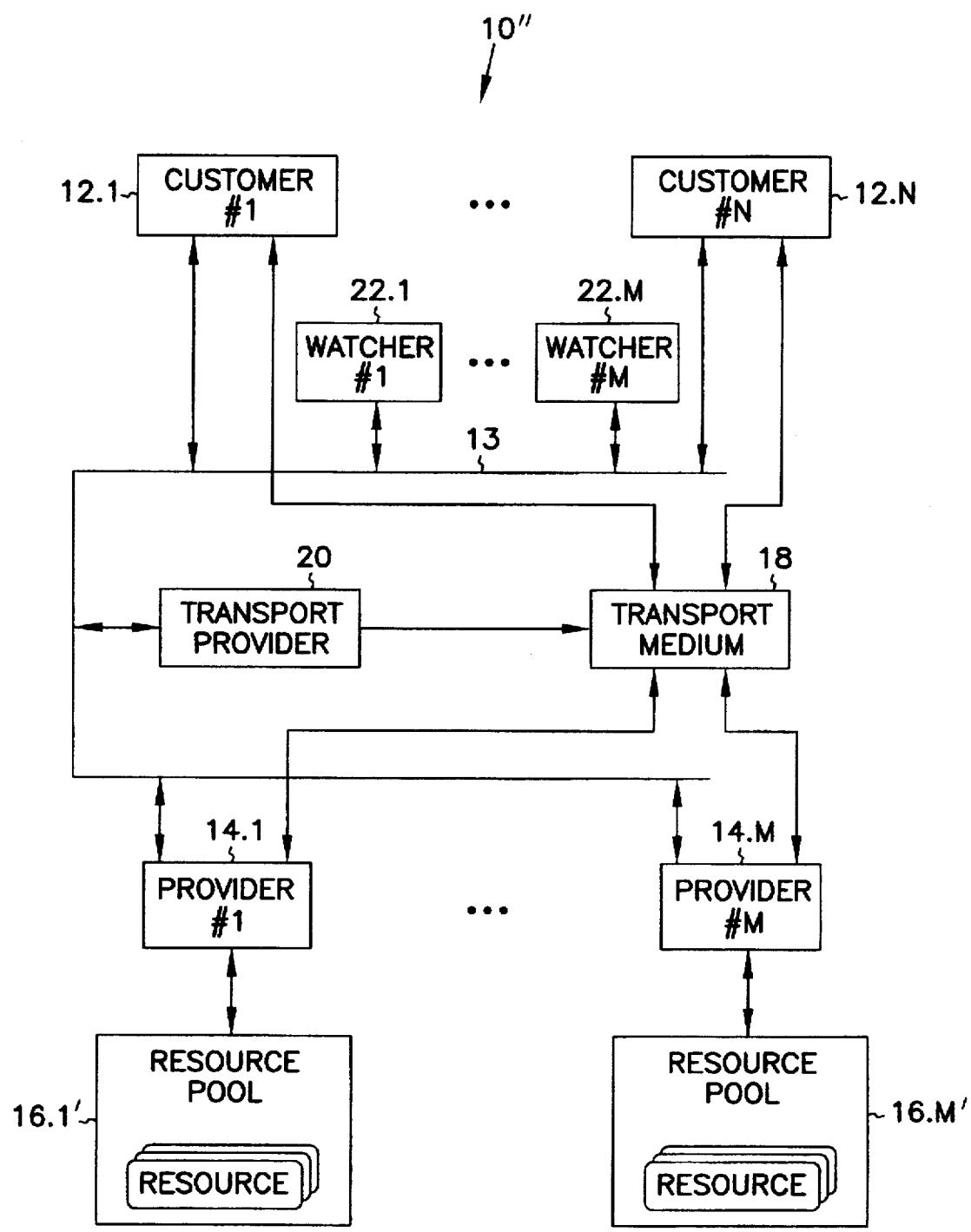

FIGS. 1A–1C are simplified block diagrams of systems for managing the transfer of commodities implemented according to the present invention. In FIG. 1A, a system 10 comprises customer stations 12.1 through 12.N connected over a network 13 to a plurality of resource pool providers 14.1 through 14.M and to one or more transport medium providers 20. Each resource pool provider 14 controls a resource pool 16 contains a resource 17 used to store or source a particular commodity. System 10 further comprises a transport medium 18 used to transfer requested commodities from a resource pool 16 to the customer station 12 which requested the commodity. Transport medium 18 is controlled by a transport medium provider 20 used to ensure that the transport medium is not scheduled in such a way that delivery of a given commodity cannot occur at the desired time.

Resource pools 16 may range from a single video tape recorder or disk array through a full blown LMS system. Each resource pool provider 14 includes provider controller software which maintains a record or inventory of commodities which are currently available or which will at some future time be available from its associated resource pool 16. Requests for commodities such as video or audio segments, manufactured goods, raw material or data are transmitted from a customer station 12 to each of the resource pool providers 14 and each resource pool provider 14 determines if the commodities needed to fill that request are stored in its associated resource pool 16. If so, the provider generates a request reply acknowledging the resource request and offering to fill the request. The customer looks at the request replies and chooses the provider 14 it will use to deliver the desired commodity based on factors such as the cost of the commodity, the quality of the commodity and the confidence the user has that the provider 14 will actually be able to supply the commodity. Delivery of the commodity is then scheduled by both the chosen provider 14 and the customer station 16.

Similarly, if a provider 14 determines that it requires a commodity not currently available in its inventory, it will generate a request for that commodity and transfer that request to the other providers 14. Again, each resource pool provider 14 determines if the commodities needed to fill that request are stored in its associated resource pool 16. If so, the provider 14 generates a request reply acknowledging the resource request and offering to fill the request. (The provider 14 sourcing the request is termed a secondary provider while the providers 14 offering to provide the desired commodity may be either primary providers which currently have the commodity in their inventory or other secondary providers which have contracted with a primary provider to add the commodity to their inventory.) The secondary provider looks at the request replies and chooses the provider 14 it will use to deliver the desired commodity based on factors such as the cost of the commodity, the quality of the commodity and the confidence the user has that the provider 14 will actually be able to supply the commodity. Delivery of the commodity is then scheduled by both the chosen provider 14 and the customer station 16.

FIG. 1B illustrates an alternate embodiment of system 10 of FIG. 1A. In FIG. 1B, resource pools 16' are connected directly to transport medium 18 in order to reduce connectivity. Commodities are transferred directly from pools 16' to transport medium 18 and from there to customer stations 12.

In the embodiments shown in FIGS. 1A and 1B, an assumption is made that a provider 14 will deliver as promised. If a particular provider 14 fails to deliver its contracted commodity a mechanism must be provided to notify the customer that scheduled transfers will not occur. In one embodiment, a cascading fallback mechanism is defined. If any provider fails to deliver as scheduled, its recipient customer or secondary provider must generate a message warning other customer stations and providers that the provider may have failed. An alternate method of monitoring for failure of a provider 14 is shown in system 10" of FIG. 1C.

Figure 4:
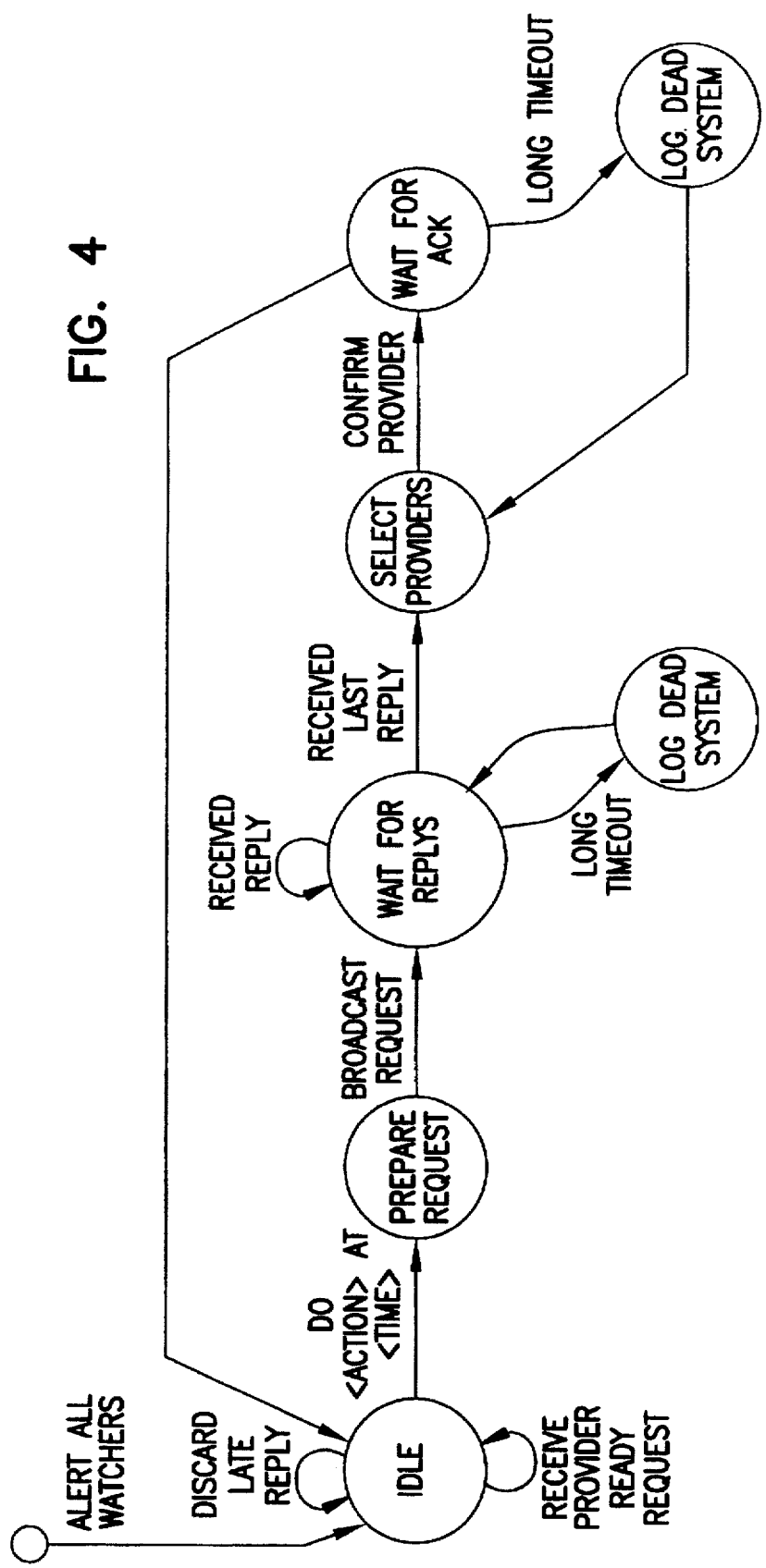
FIG. 4 is one embodiment of high level program flow control associated with a customer daemon.
Figure 5:
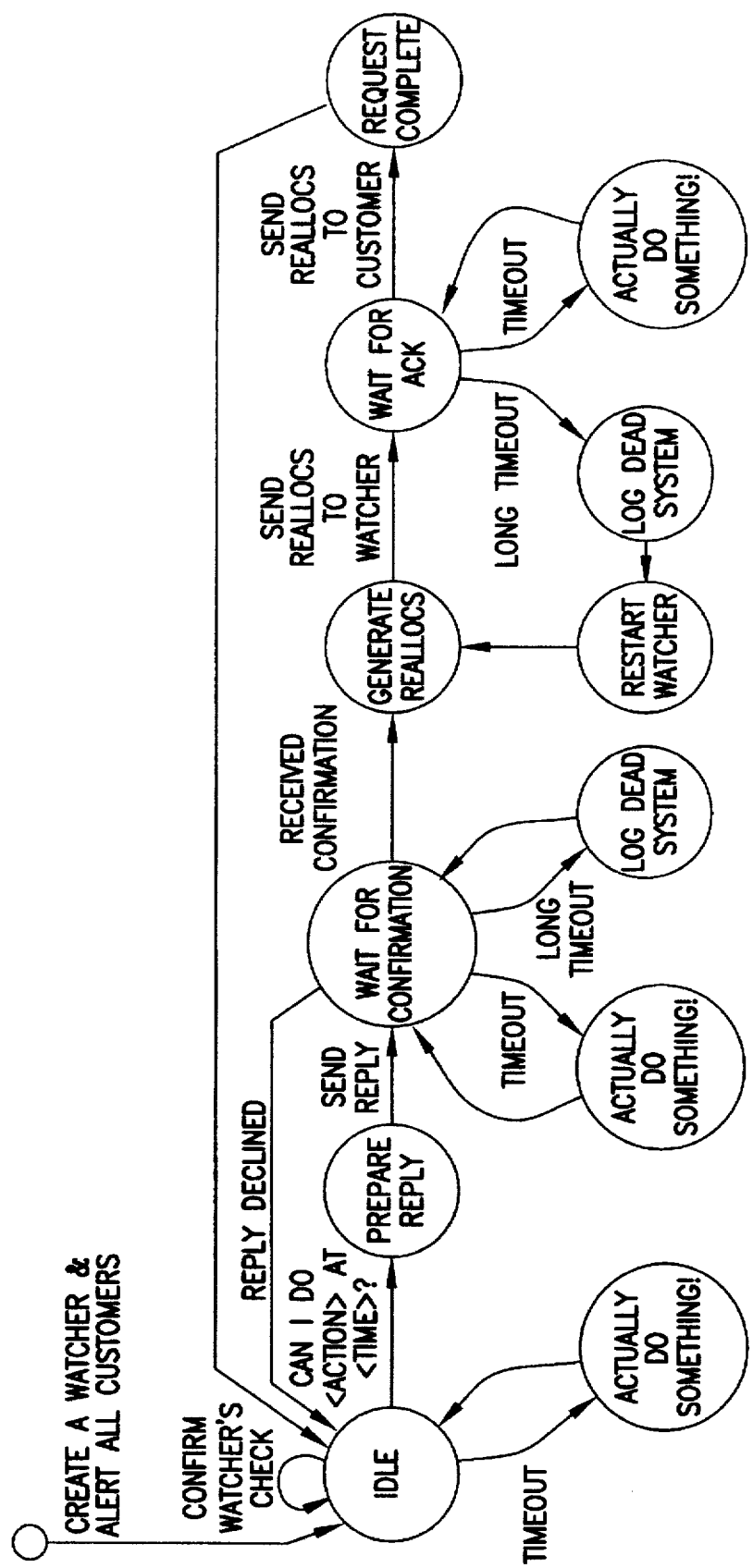
FIG. 5 is one embodiment of high level program flow control associated with a provider daemon.
Figure 6:
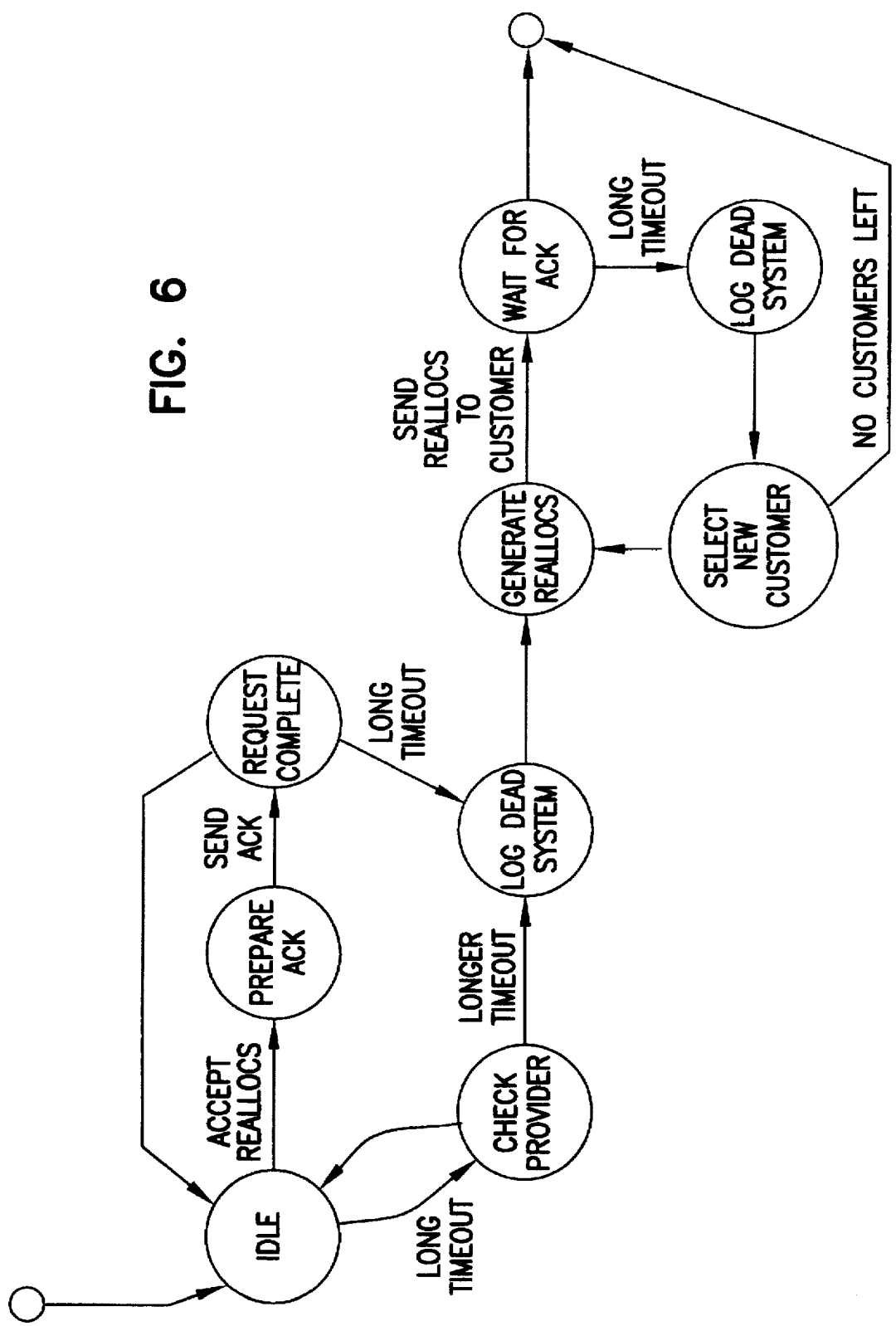
FIG. 6 is one embodiment of high level program flow control associated with a watcher daemon.

In FIG. 1C, watcher daemons 22 are provided for monitoring activity by particular providers 14 and 20. Watcher daemons 22 must be located on processor other than the processor executing the provider being monitored. Representative flow diagrams showing operation of customer stations 12, provider stations 14 and watcher daemons 22 are illustrated in FIGS. 4-6, respectively. Resource pool providers 14 maintain an inventory of current and future commodities that each provider has access to and respond to requests from customer stations 12 or by other providers 14 by determining if the commodity requested is available from inventory or can be obtained within the desired time frame. If so, they generate a request reply tendering an offer to provide the desired commodity.

Figure 2:
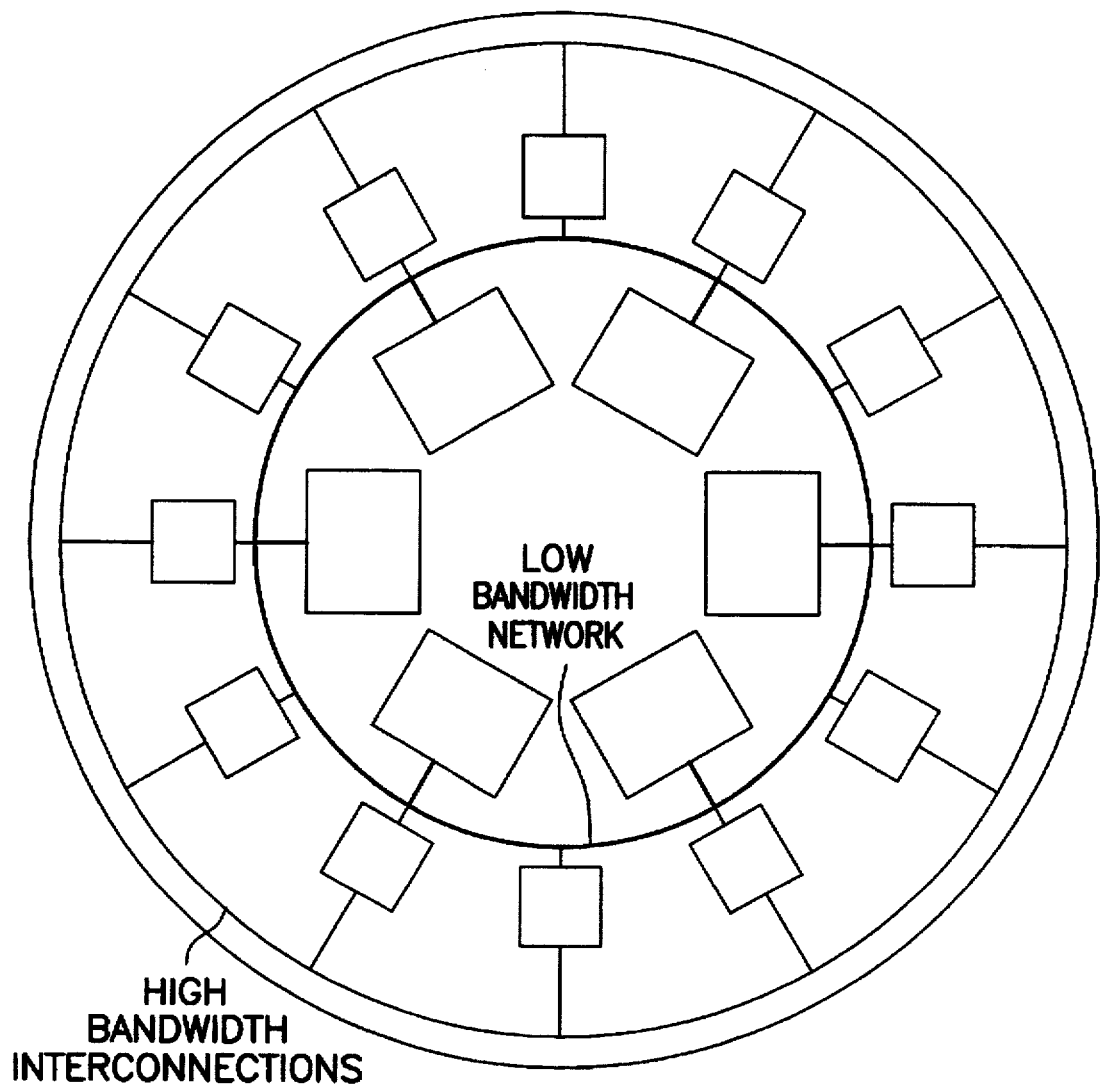
FIG. 2 is a block diagram of one embodiment of a system for transferring commodities such as video, audio and data over a high bandwidth transport medium.
Figure 3:
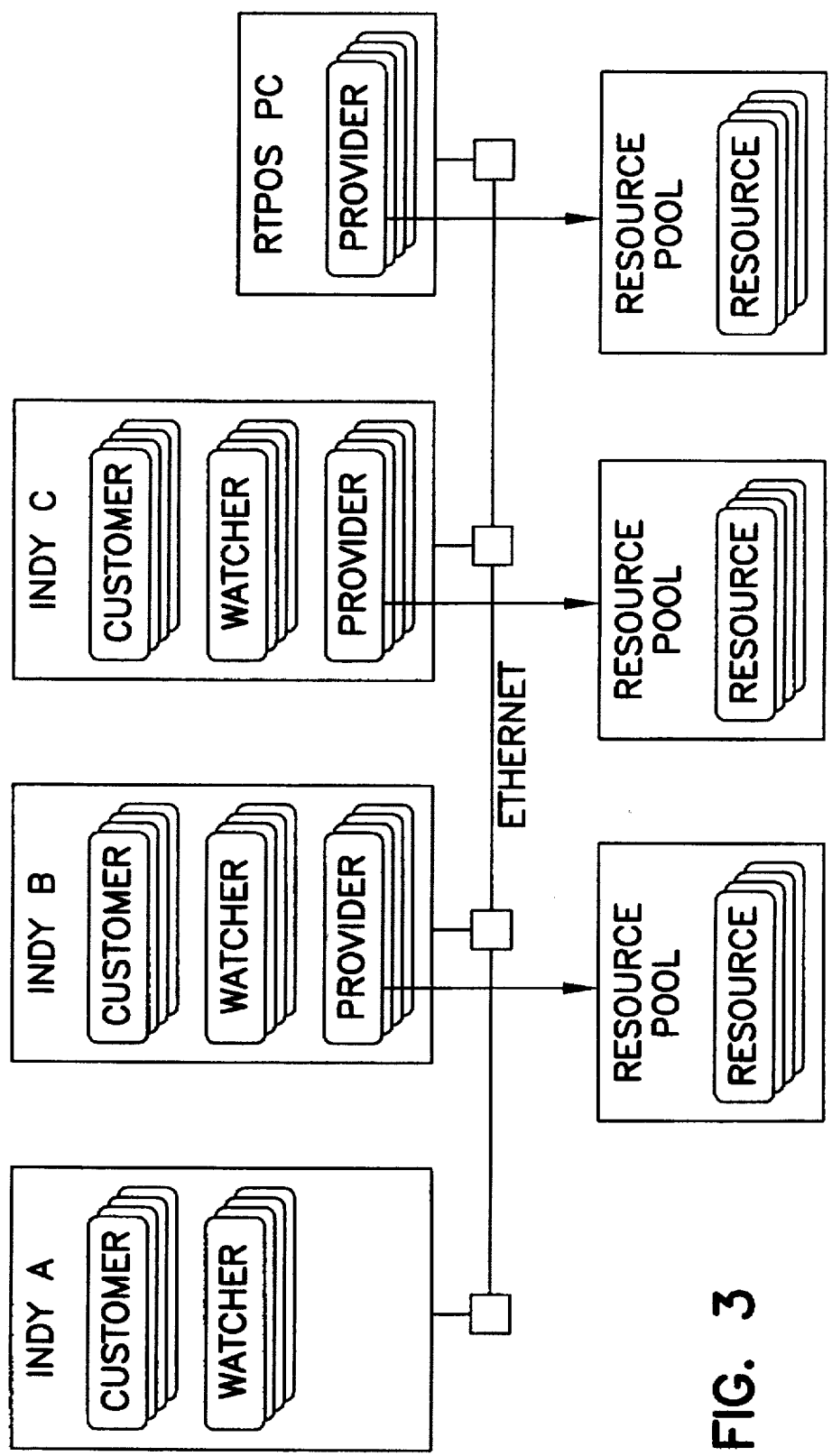
FIG. 3 is a block diagram representative of one embodiment of a resource control system which can be used in a video or audio production environment.

FIG. 2 is a block diagram of one embodiment of a system 10 for transferring commodities such as video, audio and data over a high bandwidth transport medium 18. In the system illustrated in FIG. 2, network 13 is a communications network such as Ethernet while transport medium 18 is a high bandwidth transfer link such as a D1 line. In one embodiment, such as is shown in FIG. 3, customer stations 12 are implemented with IRIS workstations provided by Silicon Graphics and high speed video is supplied to each workstation through either a VINO, SVideo or composite video port in the IRIS workstation. In the preferred embodiment, the D1 output of each resource pool 16 is connected to an input of a crossbar switch while an output of the crossbar switch is connected to each IRIS workstation through its VINO port and to an input of each resource pool 16.

Events are displayed on a customer station in the form of icons. Icons can be used to represent a current video or audio segment or can be used to represent a task that needs to be completed in the future (a pending event). If the task requires action on the part of another user in the system, an E-mail or voice mail message will be sent to that person requesting that the particular task be completed. In the meantime, an icon representing the result of that task can be used within the editing and production process as if the task has been completed. A provider which has contracted to provide the resulting video or audio segment will monitor completion of the task and provide the desired video audio segment at the desired time. (Desired times may be defined as at a particular time, by a particular time, or as soon as possible.) Once the task is completed, the provider automatically inserts the clip into the placeholder icon and the program segment is ready to be played back or aired. In addition, the provider can generate warning messages as the desired time approaches if the task is not yet complete.

Figure 7:
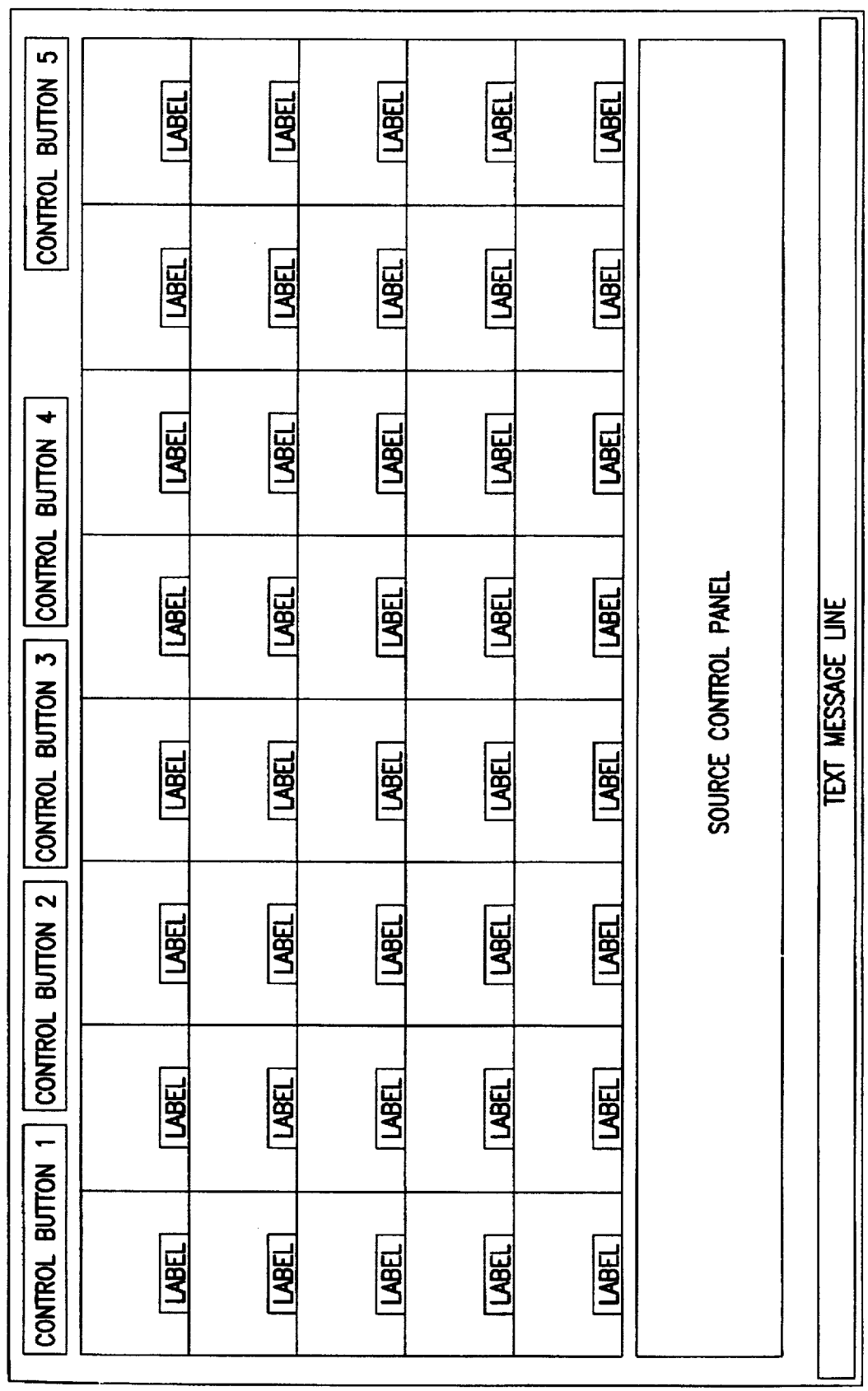
FIG. 7 is one embodiment of a video icon array which can be used with the present invention.

The use of pending events frees the editor from the constraints of having all segments available at the time of editing. The editor can operate on video or audio segments as if they are currently available and the contracting provider fills in the pending event as it becomes available. In the preferred embodiment, therefore, video segments can be displayed as icons within a video icon array and can be manipulated by the user by simply dragging and dropping each icon. FIG. 7 is one embodiment of a video icon array which can be used with the present invention. Icons 40 representing video or audio segments may be displayed on the array and a user can click on the icon to display video in real time or to listen to audio associated with a given icon.

Figure 8:
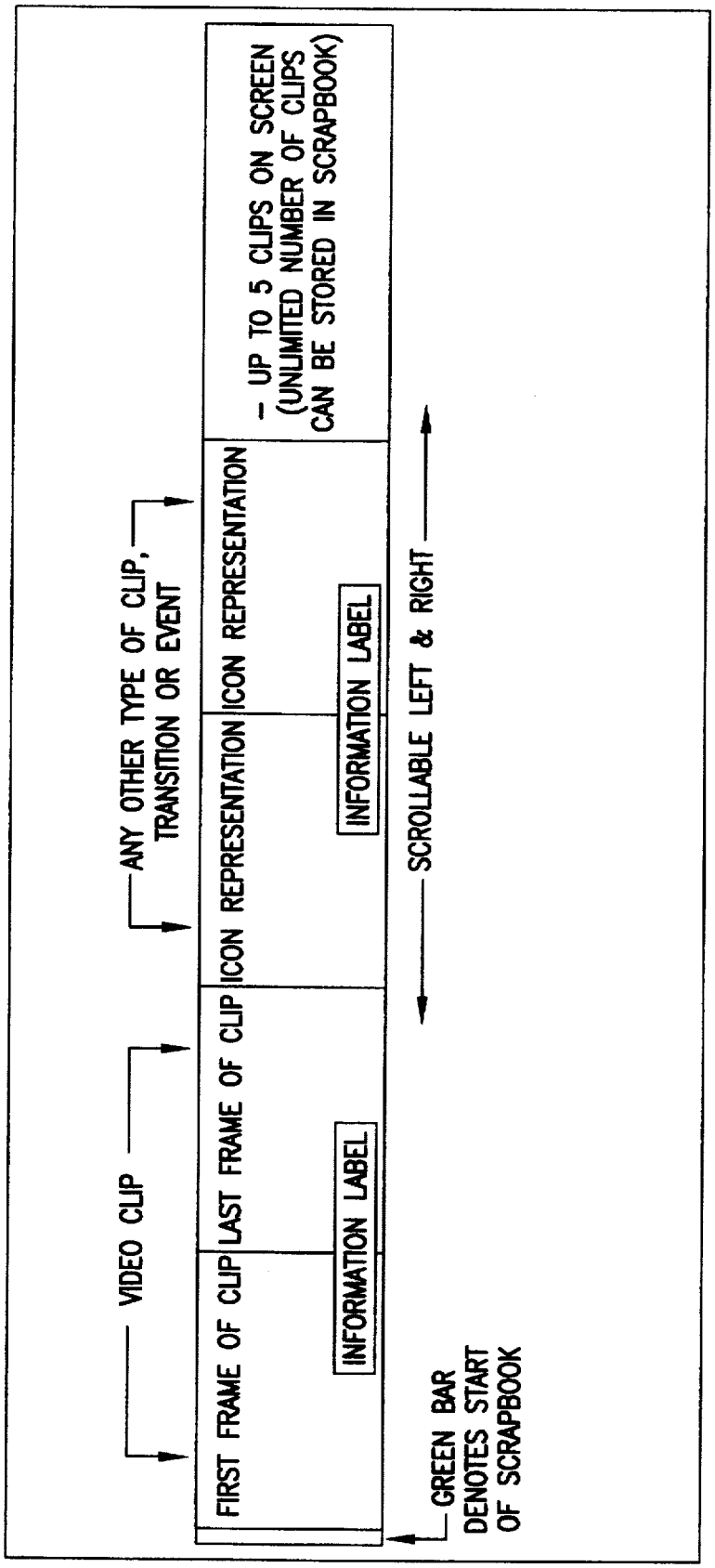
FIG. 8 is one embodiment of a scrapbook icon array which can be used with the present invention.

Similarly, as is illustrated in FIG. 8, icons representing the beginning and ending of clips can be placed in sequence within a scrapbook that can be scrolled from right to left. The icons stored in the scrapbook can be used to construct nested sequences of icons used to build an entire video or audio program.

Figure 9:
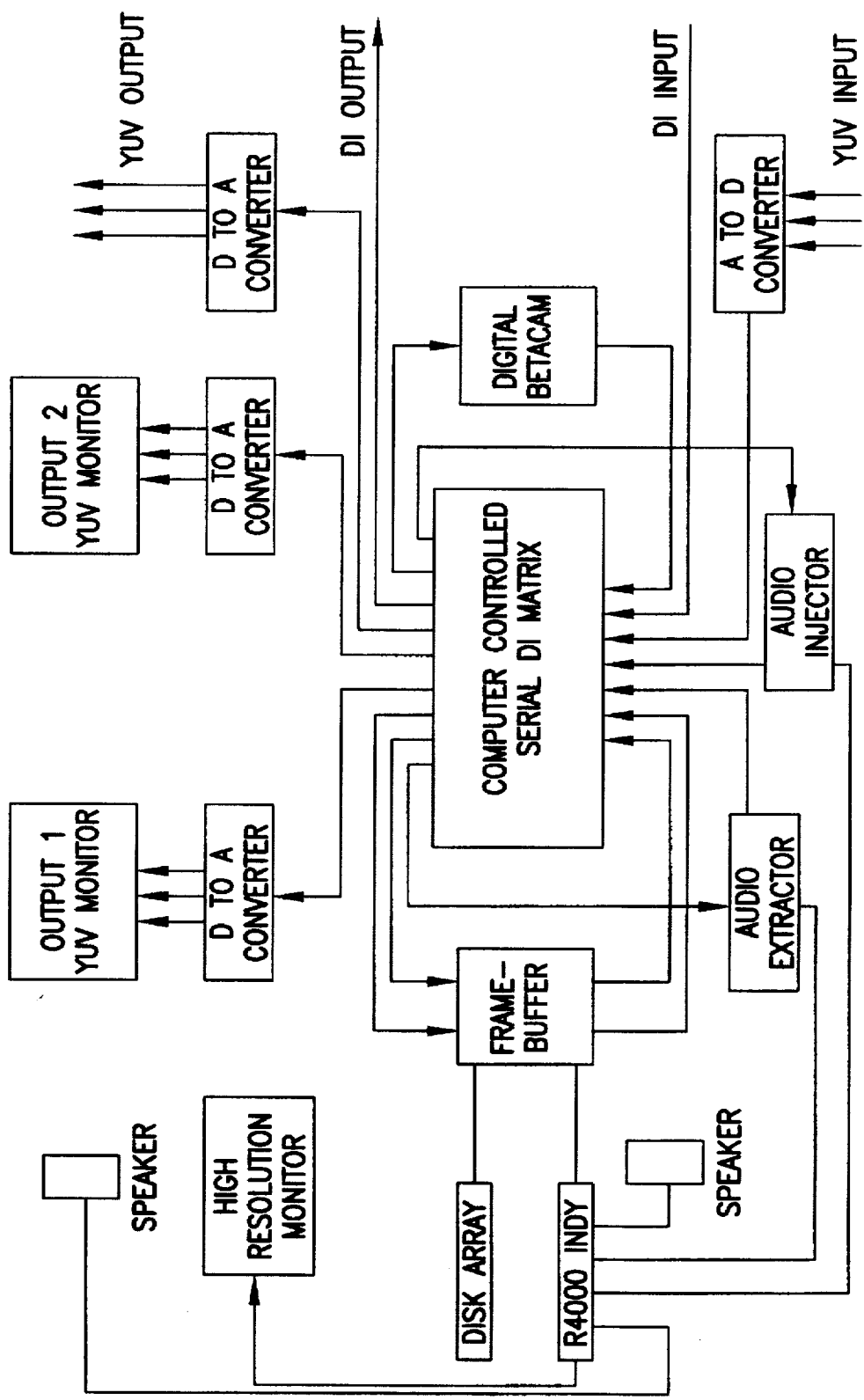
FIG. 9 is a block diagram of a video and audio editing system implemented according to the present invention.

FIG. 9 is a block diagram of a video and audio editing system implemented according to the present invention. It illustrates the serial D1 crossbar switch or matrix which serves as transport medium 18. As can be seen in FIG. 9, video and audio segments can be transferred to station 12 through medium 18 or can be used to drive monitors 50.

Figure 10:
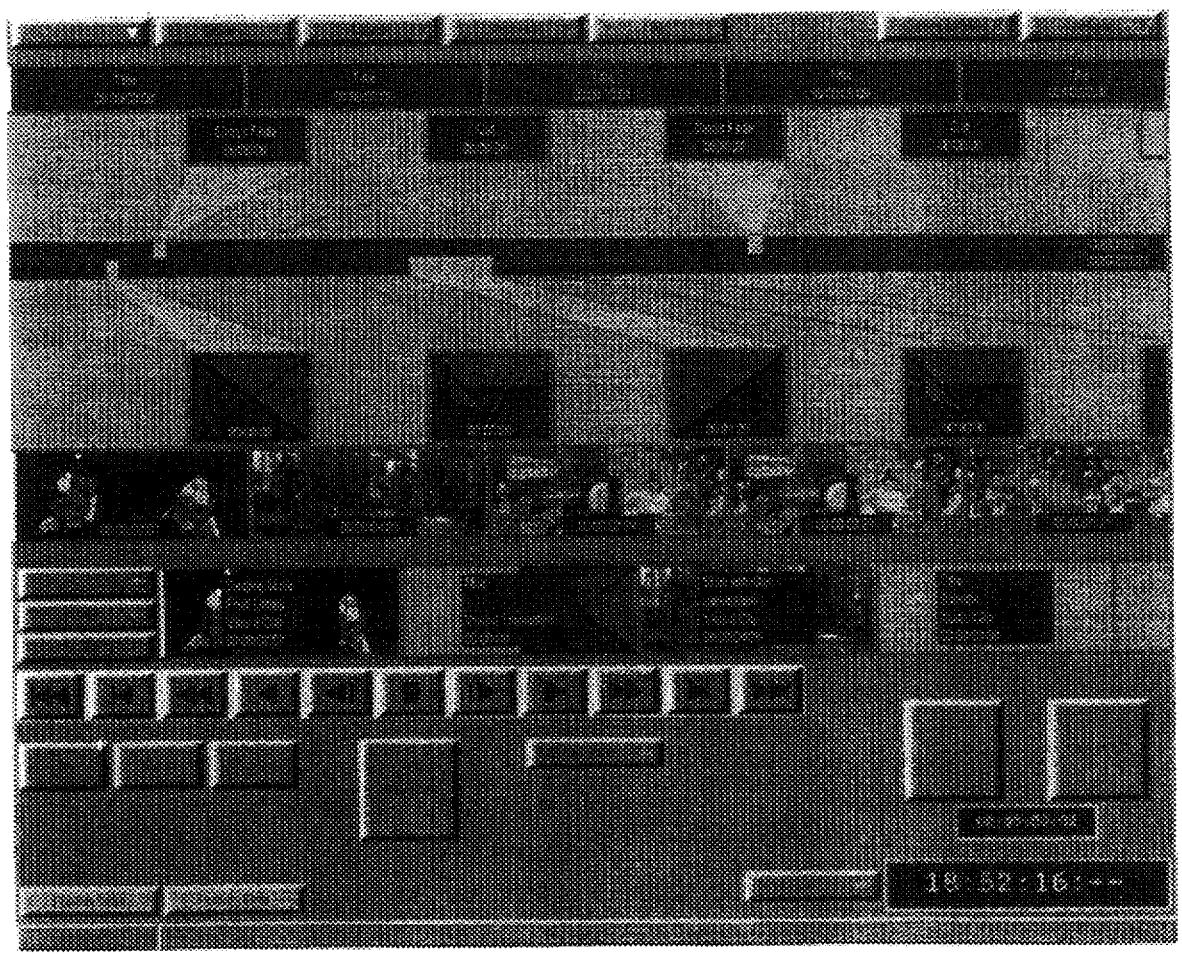
FIG. 10 illustrates one embodiment of a editor screen which can be used with the video and audio editing system of FIG. 9.

FIG. 10 illustrates one embodiment of a editor screen 60 which can be used with the video and audio editing system of FIG. 9. Editor screen 60 includes a scrapbook 62 used for temporary storage of video and audio icons to be used in a program, a clock 64 used to indicate the desired time, a video sequence 66 used to display the sequence of video icons and the times at which each segment begins and ends. Editor screen 60 also includes a timeline 68 used to illustrate transitions between events and video effects 68 and 70 used to transition between video segments. As can be seen in FIG. 9, the use of icons to describe video effects at transitions and to denote video and/or audio segments is useful in creating a program timeline. In addition, since unfinished tasks can be shown as if they have been completed, program editing can proceed smoothly. When the pending tasks are executed, the resulting video, audio or graphical segments merge smoothly into the existing program sequence.

Figure 11:
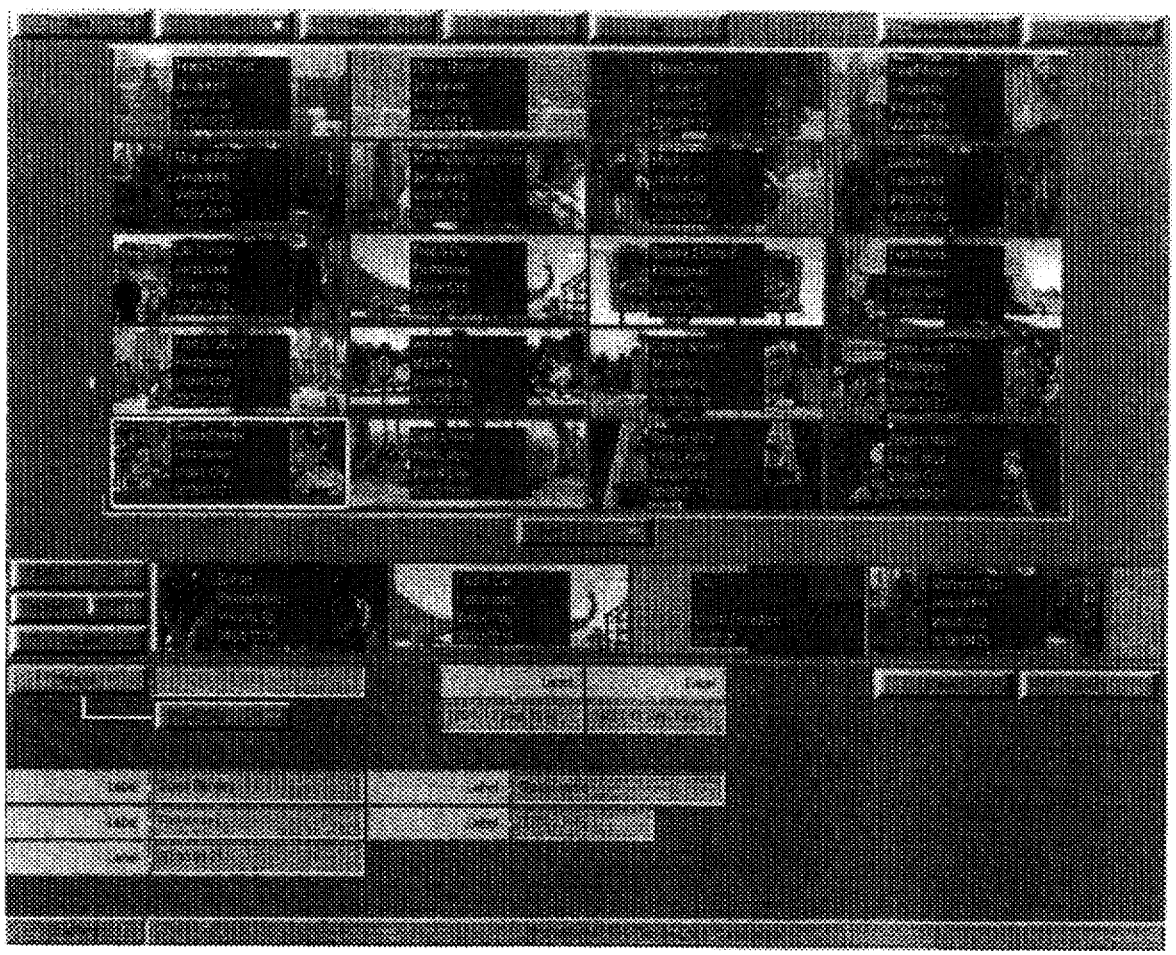
FIG. 11 illustrates one embodiment of a library screen which can be used with the video and audio editing system of FIG. 9.

FIG. 11 illustrates one embodiment of a library screen which can be used with the video and audio editing system of FIG. 9. Icons 70 are used to designate particular video or audio segments. These icons can be dragged to scrapbook 72 and then used within the editor screen. Again, the system does not distinguish between pending events and those segments already existing in inventory within one of the resource pools 16.

Figure 12:
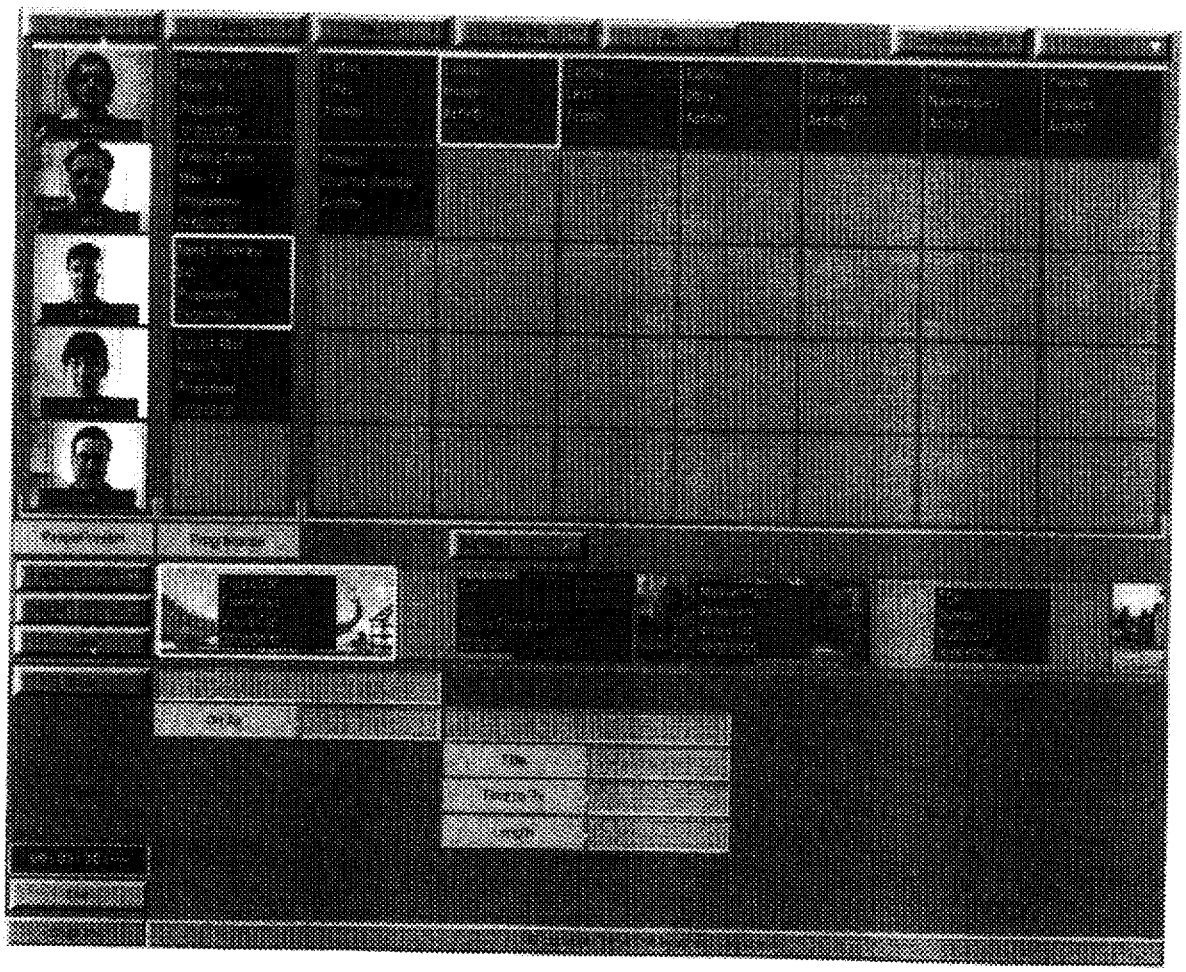
FIG. 12 illustrates one embodiment of a project planning screen which can be used with the video and audio editing system of FIG. 9.

FIG. 12 illustrates one embodiment of a project planning screen which can be used with the video and audio editing system of FIG. 9. Each icon 74 represents a task to be completed as part of a program design.

Figure 13:
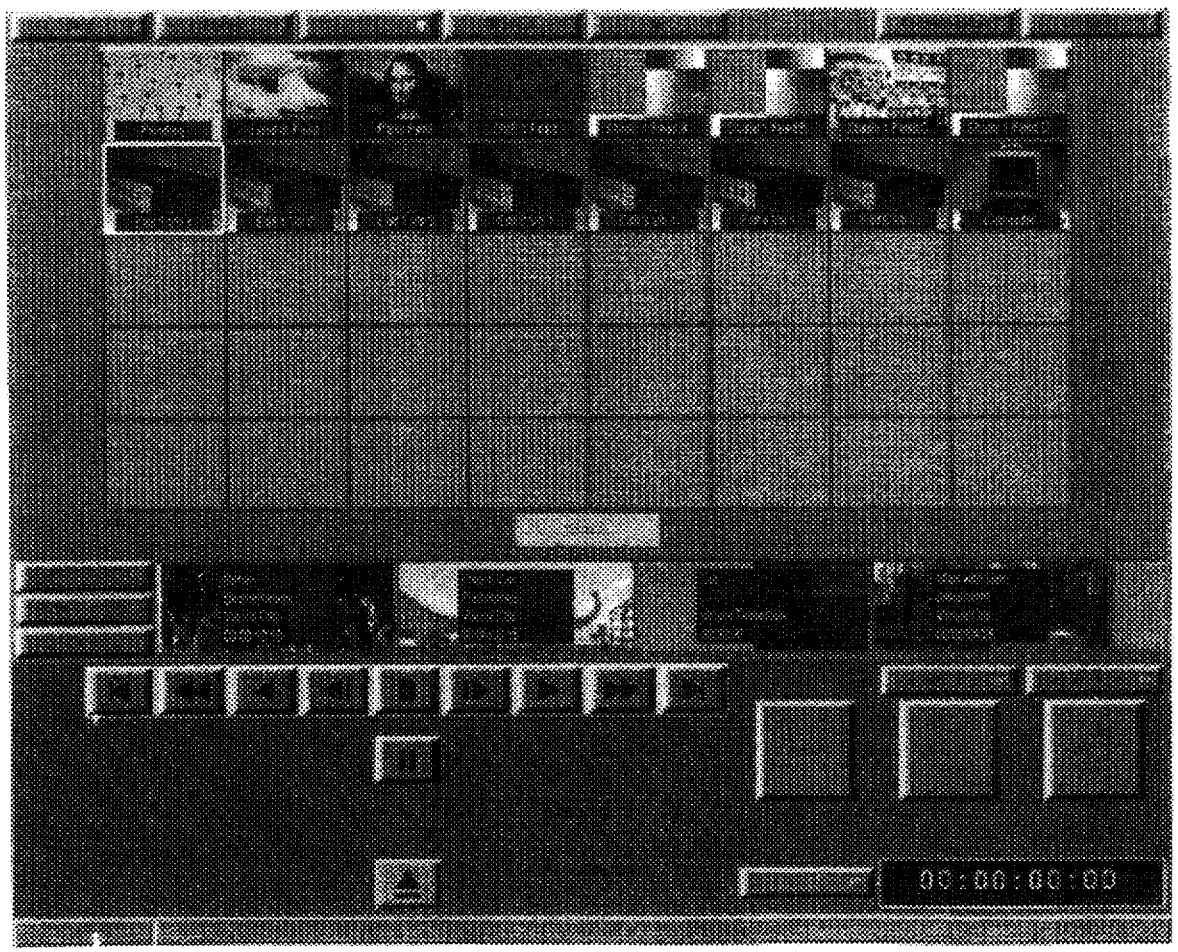
FIG. 13 illustrates one embodiment of a resource access screen which can be used with the video and audio editing system of FIG. 9.

FIG. 13 illustrates one embodiment of a resource access screen which can be used with the video and audio editing system of FIG. 9. Each icon 76 represents a video source which either contains or will contain a given video segment.

Figure 14:
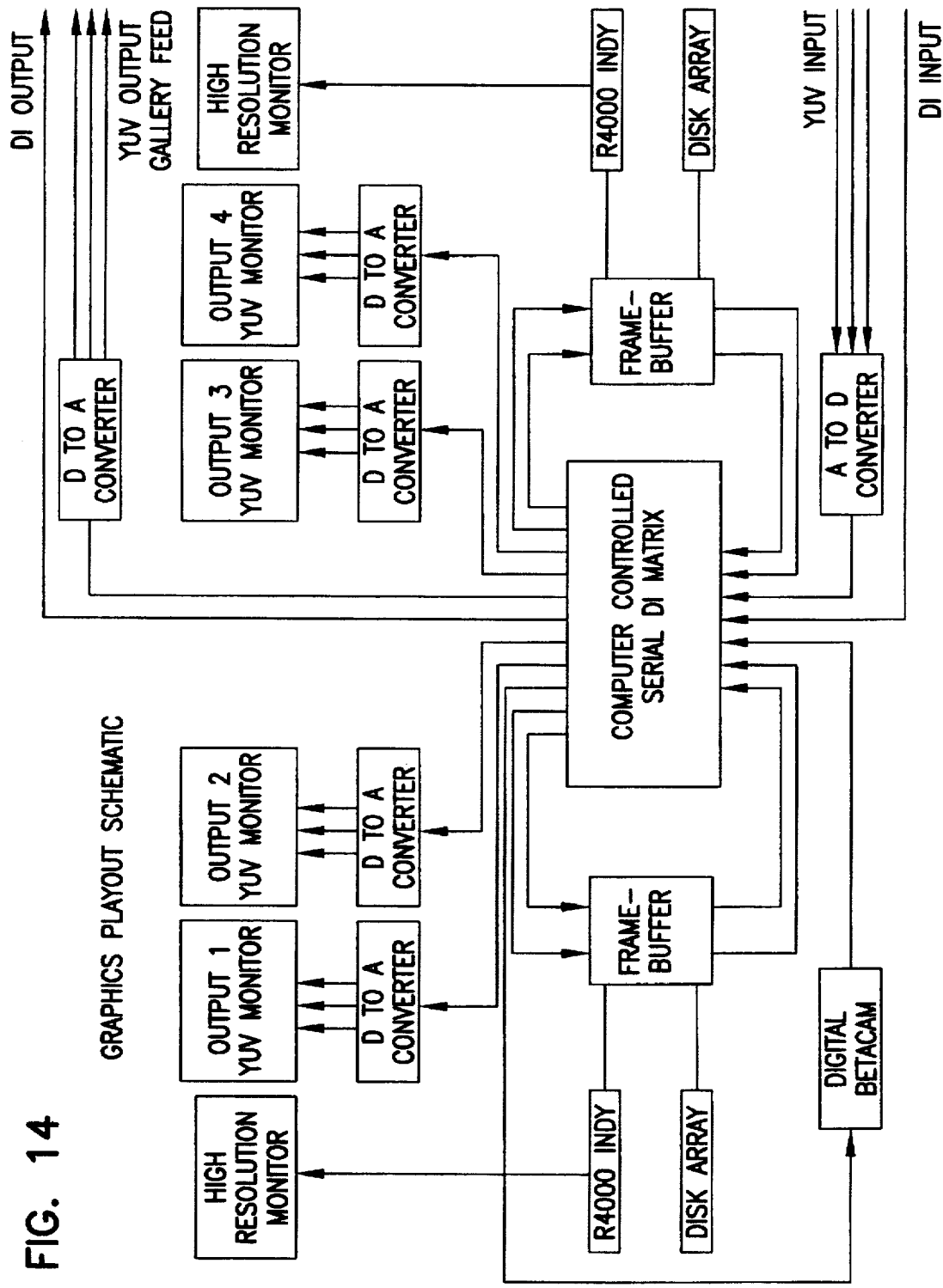
FIG. 14 is a block diagram of one embodiment of a system for adding graphics to video.

FIG. 14 is a block diagram of one embodiment of a system for adding graphics to video.

Figure 15:
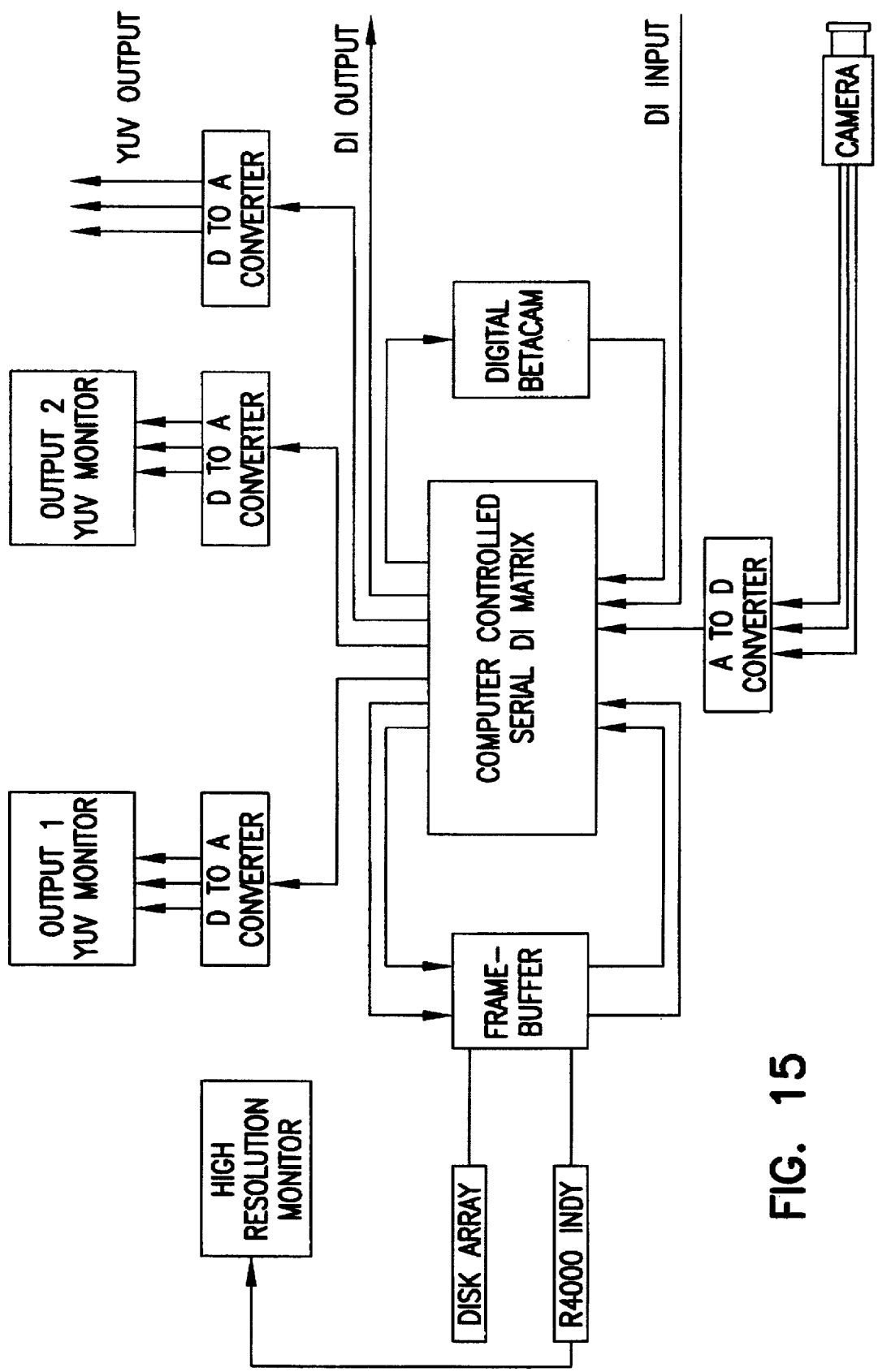
FIG. 15 is a block diagram of one embodiment of a system for producing graphics which can be used in the system of FIG. 14.

FIG. 15 is a block diagram of one embodiment of a system for producing graphics which can be used in the system of FIG. 14.

Figure 16:
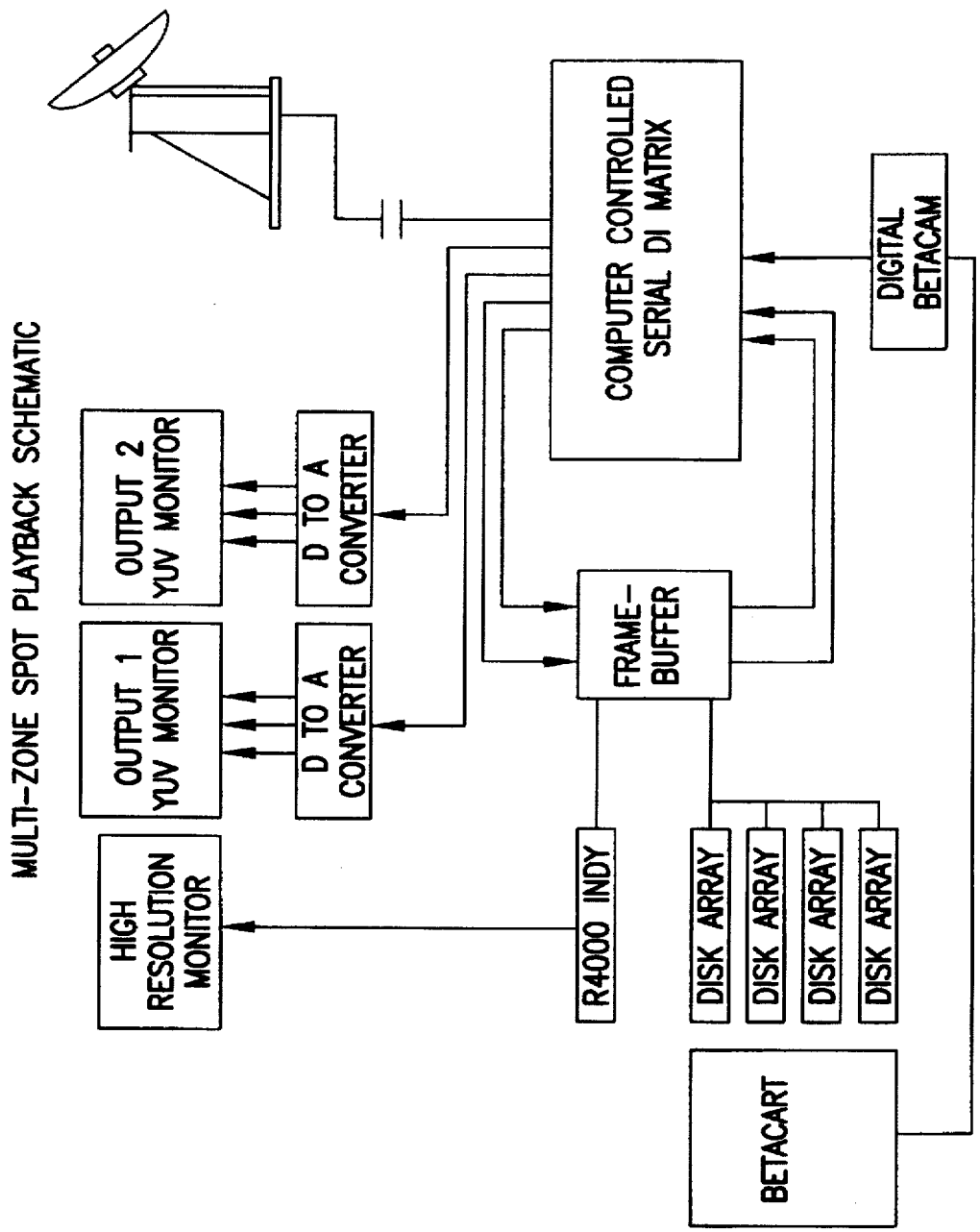
FIG. 16 is a block diagram of one embodiment of a video production system according to the present invention.

FIG. 16 is a block diagram of one embodiment of a video production system according to the present invention.

Figure 17:
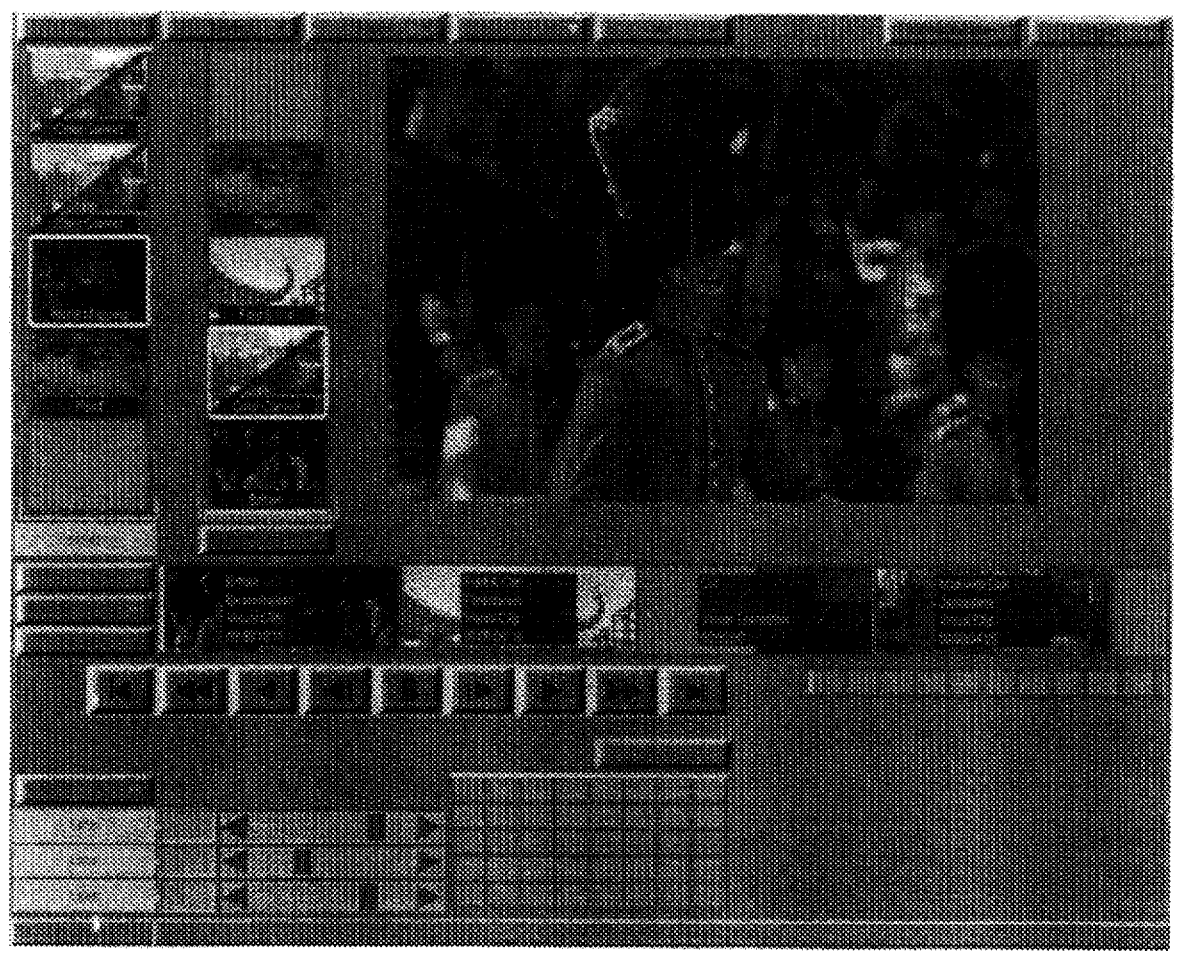
FIG. 17 is a block diagram of a visual equation builder.

FIG. 17 is an illustration of a visual equation building screen which can be used with the present invention. A video icon 78 and a processing method icon 80 can be dragged to the equation builder 82 to be define a video processing to be performed on the video segment. The resulting video is displayed within window 84. Additional processing icons 80 can be dragged to equation builder 82 to perform multiple operations on segment 78.

It shall also be understood by those of skill in the art that there are many ways in which the above described system may be used to control the transfer of commodities. Uses range from video and audio production, through factory automation, to banking and inventory control. For example, the competitive nature of the provider system could be used in a video on demand system in which a given provider will indicate to a consumer when a particular video will be displayed. Competition between providers could result in a less expensive viewing of the video if the customer is willing to wait a certain period of time. It should be understood by those of skill in the art that although specific embodiments have been described herein, that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A system for the transmission and distribution of video signals, wherein the system comprises:

a network;

a customer station connected to the network, wherein the customer station includes message transfer means for generating a request for a video segment and receiving means for receiving the requested video segment;

a transport medium connected to the customer station, wherein the transport medium includes means for transferring the requested video segment to the customer station;

a plurality of resource pools including a first resource pool, wherein the first resource pool includes a video source for providing the requested video segment;

a plurality of providers, wherein each of the plurality of providers is associated with one of the plurality of resource pools and wherein the plurality of providers includes a first provider associated with said first resource pool, wherein each provider includes request receiving means for receiving requests generated by said customer station, resource pool management means for maintaining a record of what is present in its associated resource pool and request reply means for indicating to said customer station whether the provider can fill the request; and means for transferring the the requested video segment from said first resource pool to said transport medium.

2. The apparatus according to claim 1, wherein at least one of said plurality of providers is implemented as a software process executing within a computer.

3. The apparatus according to claim 1, wherein the first provider comprises a resource control unit electrically connected to the video source, wherein the resource control unit comprises a controller and network interface means for receiving the requests generated by said customer station and for transmitting a request reply to said customer station.

4. A method of producing a program from a pending clip, comprising the steps of:

providing a customer station;

providing a plurality of video sources;

providing a plurality of providers, including a plurality of video source providers associated with said video sources, wherein each video source provider includes a provider controller which maintains a record of video segments available from its video source;

defining at said customer station an icon, wherein the icon represents a pending video segment formed from a requested video segment, wherein the step of defining includes defining when delivery of the requested video segment is desired;

checking the plurality of video sources for the requested video segment, wherein the step of checking the plurality of video sources includes the steps of:

executing provider program code within each of said plurality of video source providers to determine if the requested video segment can be delivered by its associated video source when it is desired; and if the requested video segment can be delivered by its associated video source when it is desired, generating a request reply to said customer station offering to provide the requested video segment and scheduling delivery of said requested video segment; and if the requested video segment cannot be sourced by one of said plurality of video sources when it is desired, generating an error; and selecting a video source provider from the video source providers which generated request replies.

5. The method according to claim 4 wherein the method further comprises the step of placing the icon in a sequence of icons representative of other video segments in order to establish a display sequence for the program.

6. The method according to claim 4 wherein the step of scheduling delivery includes the step of checking prior to the time the requested video segment is needed to ensure that delivery is still possible; and if delivery is not still possible, generating a cancellation message to said customer station.

7. The method according to claim 4 wherein the step of selecting a video source provider includes the step of analyzing the request replies received to determine which video source provider will provide optimal cost, quality and confidence.

\* \* \* \* \*